(12) United States Patent
Goudezeune et al.

(10) Patent No.: US 6,885,702 B1
(45) Date of Patent: Apr. 26, 2005

(54) METHOD FOR SPATIAL SYNCHRONIZATION OF A DIGITALLY CODED VIDEO IMAGE AND/OR FOR IDENTIFICATION OF THE SYNTAX OF A VIDEO SEQUENCE

(75) Inventors: Gabriel Goudezeune, Metz (FR); Jamal Baina, Nancy (FR); Pierre Bretillon, Metz (FR)

(73) Assignee: Telediffusion de France, Paris (FR)

( * ) Notice: Subject to any disclaimer, the term of this patent is extended or adjusted under 35 U.S.C. 154(b) by 0 days.

(21) Appl. No.: 09/543,913

(22) Filed: Apr. 6, 2000

Related U.S. Application Data (63) Continuation of application No. PCT/FR98/02099, filed on Oct. 1, 1998.

(30) Foreign Application Priority Data

Oct. 6, 1997 (FR) .............................................. 97 12415

(51) Int. Cl.[7] .................................................. H04B 1/66
(52) U.S. Cl. ........................... 375/240.12; 375/240.18; 375/240.2; 375/240.28; 375/240.24; 382/248; 382/250; 382/239
(58) Field of Search ....................... 375/240.12, 240.13, 375/240.14, 240.28, 240.24, 240.26, 240.08, 240.18, 240.2; 382/232, 239, 236, 248, 250; 348/699, 403, 420, 423

(56) References Cited

U.S. PATENT DOCUMENTS

| | | | |
|---|---|---|---|
| 3,971,888 A | * 7/1976 | Ching et al. ............ | 375/240.08 |
| 5,214,508 A | 5/1993 | Stevens | |
| 5,231,484 A | 7/1993 | Gonzales et al. | |
| 5,515,105 A | 5/1996 | Lim | |
| 5,574,500 A | 11/1996 | Hamada et al. | |
| 5,579,050 A | * 11/1996 | Jung ..................... | 375/240.14 |
| 5,650,860 A | 7/1997 | Uz | |
| 6,141,448 A | * 10/2000 | Khansari et al. ............ | 382/236 |
| 6,256,413 B1 | * 7/2001 | Hirabayashi ................ | 382/232 |

FOREIGN PATENT DOCUMENTS

| | | | |
|---|---|---|---|
| EP | 0 620 685 A2 | * 10/1994 | ............ H04N/7/13 |
| EP | 94302669.0 | 10/1994 | |
| WO | WO 93/19434 | 9/1993 | |
| WO | WO 95/03674 | 2/1995 | |
| WO | PCT/GB95/01507 | 6/1995 | |

OTHER PUBLICATIONS

Mester et al., Spectral Entropy–Activity Classification in Adaptive Transform Coding, 1992, IEEE, vol. 10, 913–917.*

G. Beakley, C. Cressy, J. Van Pelt, Video Compression: The Need for Testing, 8012 SMPTE Journal, 104 (1995) Nov., No. 11, White Plains, NY, US.

Ricardo De Queiroz, C.K. Choi, Young Huh, and K.R. Rao, Wavelet Transforms in a JPEG–Like Image Coder, IEEE Transactions on Circuites and Systems for Video Technology, vol. 7, No. 2, Apr. 1997.

* cited by examiner

*Primary Examiner*—Shawn S. An
(74) *Attorney, Agent, or Firm*—Michael Best & Friedrich LLP (57) ABSTRACT

The invention concerns a method for synchronising a video image (IM) spatial position to find the position of an initial digital coding grid (GI), by said image (IM) coding blocks, characterised in that it consists in the following steps: a) moving along the direction of the image (IM) lines and/or along the direction perpendicular to the image (IM) lines, an analysis grid (GA) consisting of coding blocks and corresponding to at least part of the image (IM); b) determining for each position of the analysis grid (GA), the transformed coefficients Fu,v of each block of the analysis grid (GA), using a discrete cosine transform (TCD); and computing for each analysis grid (GA) position, an activity parameter (AM, ES) representing the image activity; c) determining the analysis grid (GA) position for which said activity parameter (AM, ES) has a minimal value.

21 Claims, 5 Drawing Sheets

METHOD FOR SPATIAL SYNCHRONIZATION OF A DIGITALLY CODED VIDEO IMAGE AND/OR FOR IDENTIFICATION OF THE SYNTAX OF A VIDEO SEQUENCE

"The present application is a continuation and claims the benefit and priority of prior international application PCT/FR98/02099, filed on Oct. 1, 1998, and FR Application No. 97/12415, filed Oct. 6, 1997.

The subject of the present invention is a method for synchronization of the spatial position of a video image, in order to recover the position of an initial grid for initial digital coding of the said image by coding blocks, as well as a method of at least partial identification of the time-based syntax of the initial coding.

The introduction of digital technology into video offers new outlooks in the fields of production, post-production, archiving and broadcasting of audio-visual signals. Moreover, this technology has imposed throughput-reducing coding methods, particularly JPEG, CCITT H261, ISO/CEI 13918 MPEG2, so as to reduce the quantity of data generated and manipulated during the various operations.

Several items of equipment currently incorporate such coding algorithms: digital video recorders, post-production editors and encoders for broadcasting. The expansion in their use often implies a succession of these operations. The cascading of these systems does not leave the signals at baseband unaffected. This is because the throughput-reducing methods are irreversible. Consequently, they introduce degradations relating to the algorithms used: for example discrete cosine transform by blocks, estimation and compensation for movements, prediction, etc. Moreover, the cascading of digital and analog devices in an audiovisual signal manipulation system introduces further degradations which are added to the accumulated degradations due to the coding. These degradations are principally due to the spatial and time-based phase shifts which interfere with the formatting of the data employed by the compression methods. In fact, the recommendations relating to the coding techniques have specified coding according to which the image is segmented into a coding grid exhibiting blocks of 8×8 pixels with a different processing syntax for the images of the same video sequence: images coded without prediction (Intra I), images coded with Unidirectional Prediction (P) and images coded with Bidirectional Prediction (B).

It is therefore beneficial to be able to have available a method making it possible to recover the synchronization corresponding to the initial digital coding grid.

Moreover, such a method is also useful for making it possible to carry out system performance tests.

In order to evaluate the impact of a system on the original signal and in order to make it possible to test its performance, it is in fact known to make a comparison between the input signal S which is representative of a source image IS, and the signal D present at the output of the system, this signal being representative of a degraded image ID. The calculation of the error signal is a diagnostic means for evaluating the performance aspects of the analog or digital systems. In the case of encoders and decoders, for example, this operation underlines the effectiveness of the throughput reduction and assesses the degradations introduced by this operation. Consequently it takes a measure of the quality of the signal at the output of the system.

However, in order to calculate the error signal, it is desirable beforehand to resynchronize the two signals so as to compare the values of the pixels situated at the same positions in the two images. For synchronization of video sequences, the article by G. BEAKLEY, C. CRESSY and J. Van PELT, which appeared in the November 1995 number of the SMPTE Journal, pages 742 to 750, under the title "Video Compression: the need for testing", proposes a spatial resynchronization. It is performed by calculating the intercorrelation function between the degraded image ID and the source image IS. The position of the maximum of the function gives the integer value, in pixels, of the spatial phase shift of the degraded image with respect to the closest reference image.

The major drawback of this method is that of requiring a reference image. This constraint can prove to be expensive and difficult to use in practice, particularly in the case in which the two source IS and degraded ID versions of the video sequence are physically separated. Moreover, the non-coded reference image represents a significant quantity of data to be stored or to be transmitted. Furthermore, the calculating time necessary for carrying out the intercorrelation operation is significant and implies complexity of the device.

The object of the present invention is to carry out the spatial synchronization (and time-based synchronization if appropriate) of the coded and decoded video sequences automatically. This operation can be made use of every time the spatial and/or time-based position information is necessary. As an example of application, it can be used to make a success of any operation implying a succession of the above-mentioned methods. In this case, this operation avoids the introduction of further defects into the video signals.

Another example of use is spatial and/or time-based synchronization in order to make a comparison between the image before coding and the decoded image. In the second case, this synchronization makes it possible later to reveal all the differences between the two images.

The method according to the invention takes account of the specific properties of the techniques applied and, as appropriate, of the structures of the content of the decoded digital images. In order to operate, the method exploits the spatial information on phase (at the pixel level, and modulo the size of the block), and/or the time-based information on phase of a sequence of video images (the composition of the image groups).

For this implementation, a linear block transform is used, in a way which is similar to the discrete cosine transform DCT employed in the MPEG standard. The invention takes advantage of the characteristic properties of the processing of the image carried out during the MPEG coding, which leaves its characteristics on the coded image. This original approach thus makes it possible to use the processing of the video signal exclusively as a basis.

Linear and orthogonal block transforms can be used (Fourier transform, discrete cosine transform, etc.). For each of the image blocks $f_{n,m}$ at the position n, m, the corresponding transform block $F_{n,m}(i, j)$ is obtained by the operation:

$$[F_{n,m}]=[T]\cdot[f_{n,m}]\cdot[T]^t$$

where T(x,y) is the transformation matrix.

The wavelet transform of the image can also be used, by reorganizing the wavelet coefficients in such a way as to obtain transform blocks of desired size, particularly of the same size as the blocks obtained by the preceding methods (discrete wavelet transform, DWT). One reorganization mode is indicated in the article by R. de Queiroz and Colleagues, entitled "Wavelet Transforms in a JPEG-Like Image Coder" and published in April 1997 in the IEEE review Trans. on Circuits and Systems for Video Technology, Vol. 7, No. 2, p. 419–424.

In particular, the use of the Discrete Cosine Transform DCT is very advantageous because of its properties and its use in the MPEG standard.

The basic idea of the invention is to take advantage of the fact that, at the position of coding by an initial grid for block digital coding, there exists a high degree of compaction of the coefficients of the block transform.

The invention thus relates to a method for synchronization of the spatial position of a video image in order to recover the position of an initial grid for digital coding of the said image by coding blocks, characterized in that it implements the following stages:

a) shifting, along the direction of the lines of the image and/or along the direction perpendicular to the lines of the image, an analysis grid consisting of said coding blocks and corresponding to at least one part of the image;

b) determining, at each position of the analysis grid, the transform coefficients Fu,v of each block of the analysis grid, via a block transform, and, for each position of the analysis grid, calculating an activity parameter representative of the activity of the image;

c) determining the position of the analysis window for which the said activity parameter represents minimal activity, and ratifying the said position as synchronization position.

The said activity parameter may be the average AM of the activities asb of the blocks of the analysis grid, the activity asb of a block being defined as being the combination, possibly weighted, and for example the sum, of the absolute values of the coefficients Fu,v, of the said block transformed by a block transform, for example a discrete cosine transform, with $(u, v) \neq (0,0)$.

It can be stated:

$$asb = \sum_{(u,v) \neq (0,0)} |k(u, v) \cdot F(u, v)|^p$$

$k(u, v)$ is a coefficient for weighting the component used, and p a constant.

According to one preferred variant, the activity parameter is the average ES of the spectral entropies esb of the blocks of the analysis grid with: $ES = \overline{esb}$, $$esb = -\sum_{(u,v) \neq (0,0)} p(u, v) \log_2[(p(u, v))], \text{ in which}$$

$$p(u, v) = \frac{|F(u, v)|}{asb} \quad \text{and} \quad asb = \sum_{(u,v) \neq (0,0)} |F(u, v)|$$

F(u, v) designating the coefficients of a single block transformed by a block transform, for example a discrete cosine transform.

The function esb which makes it possible to characterize the spatial synchronization position can be calculated using the following formula:

$$esb = -\sum_{(u,v) \neq (0,0)} k(u, v) \cdot p(u, v) \log_2[(p(u, v))] \text{ with}$$

$$asb = \sum_{(u,v) \neq (0,0)} |k(u, v) \cdot F(u, v)|^p \quad \text{and} \quad p(u, v) = \frac{|F(u, v)|^p}{asb}$$

$k(u, v)$ is a coefficient for weighting the component used, and p a constant.

There are several options for choosing the constants $k(u, v)$, and the choice of one or the other is made on the basis of the application sought. In fact, the function $k(u, v)$ is chosen depending on the characteristic to be brought to the fore: taking account of the visual system or extracting a part of the relevant information. The following cases are proposed:

1) the first method is to be used when good correlation with human perception is favoured. In this, the values of the constants $k(u, v)$ are initialized as a function of relative importance of the coefficients of the transform for the human eye, particularly its frequency sensitivity, so as to supply an activity parameter representative of what is perceived. For example, in the case of the DCT, $k(u, v) = 1/Q(u, v)$ is taken. The $Q(u, v)$ are the components of the quantization matrix exploited for the throughput reduction, set out in the following document extracted from the MPEG-2 standard: ISO/IEC CD 13818-2: "Information technology—Generic coding of moving pictures and associated audio information—Part 2: video", 1 Dec. 1993, p. 45, § 6.3.7.

2) the second method is used when the DCT coefficients affected by the compression are identifiable. The constants $k(u, v)$ are chosen in such a way as to eliminate certain coefficients of the transform used. In fact, the weighting $k(u, v)$ is used in order to retain the coefficients which are affected or sensitive to a given degradation. This involves a binary matrix allocating zero to the coefficients to be eliminated and one to the relevant coefficients. The selection is based either on the position of the coefficient in the DCT matrix (a), or on its average amplitude (b).

a) the coefficients corresponding to the high spatial frequencies are often those most affected by compression. An example of a weighting matrix depending on the placing of the DCT coefficient is given in the table below:

| | u | | | | | | | |
|---|---|---|---|---|---|---|---|---|
| v | 0 | 0 | 0 | 0 | 1 | 1 | 1 | 1 |
| | 0 | 0 | 0 | 0 | 1 | 1 | 1 | 1 |
| | 0 | 0 | 0 | 0 | 1 | 1 | 1 | 1 |
| | 0 | 0 | 0 | 0 | 1 | 1 | 1 | 1 |
| | 1 | 1 | 1 | 1 | 1 | 1 | 1 | 1 |
| | 1 | 1 | 1 | 1 | 1 | 1 | 1 | 1 |
| | 1 | 1 | 1 | 1 | 1 | 1 | 1 | 1 |
| | 1 | 1 | 1 | 1 | 1 | 1 | 1 | 1 | b) certain low-amplitude coefficients are brought down to zero during the compression stage.

In order to chose these coefficients, a weighted average of each of the coefficients over the image region analysed (of size M,N blocks) is formed:

$$moyCoef(u, v) = \sum_{m=i}^{M} \sum_{n=i}^{N} \left| \frac{F_{n,m}(u, v)}{Q(u, v)} \right|,$$

where Q(u,v) is defined as above, at 1)

The coefficients the averages of which are among the 48 lowest values are adopted. For these values, k(u, v)=1, and for the others k(u, v)=0.

In the case of the "Spectral Entropy" parameter ES, k(u, v)=1, and p=1 are fixed for the description of the examples.

It is advantageous to ratify the said position during stage c only if the minimum value of the activity which the activity parameter represents is higher than a given threshold A, which corresponds to a minimum richness" of the image which is required in order to consider the synchronization position as relevant.

The said shifting of the analysis grid may be carried out in steps equal to an inter-pixel distance or to a multiple thereof. The said shifting may also take place in steps less than the inter-pixel distance.

According to one preferred embodiment, the synchronization of the spatial position implements a shifting called sub-pixel shifting, that is to say a horizontal spatial phase shift less than the inter-pixel distance.

The method according to the invention is, to that end, characterized in that it includes, before stage a, a stage of analog-digital conversion using a converter exhibiting a sampling clock in order to sample image signals, and in that it includes, after stage c:

a stage d of shifting dX of the analysis grid in the direction of the lines of the image, modifying by at least one increment dϕ the sampling phase of the image signals;

a stage e of determination, for at least one shifted position dX of the analysis grid, defined during stage d, of the said transformed coefficients Fu,v and of the said parameter representative of the activity of the image.

The method can then be characterized in that, during stage d, said sub-pixel is examined by shifting the analysis grid along a plurality of said shifted positions of the analysis grid which are obtained by altering the sampling phase in dϕ increments, in that, during stage e, there is determined, for each of the shifted positions, the said transformed coefficients Fu,v and the said parameter representative of the activity of the image, and in that it includes a stage f for determination of the position of said sub-pixel (dϕ$_o$, dX$_o$) of the analysis grid for which the said activity parameter represents a minimum value.

The method may include, after stage e, a stage g of determining the said activity parameter according to two said shifted positions, one of which is a position called advanced position (dX+Δ) and the other is a position called retarded position (dX−Δ).

This stage g may advantageously be followed by a stage h of determining the average of the activity parameter over M images, for each of the advanced (dX+Δ) and retarded (dX−Δ) positions.

According to one preferred variant, the method employs feedback on the phase ȯ of the said sampling clock. This control can be applied on the basis of an error signal which is the difference between the said average of the activity parameter for the retarded position (dX−Δ) and the said average of the activity parameter for the advanced position (dX+Δ).

The activity parameter is preferably the spectral entropy ES, and the said error signal is preferably normalized by the average spectral entropy $\overline{ES}$ of at least one area of the image.

The method according to the invention thus makes it possible to identify the images of the type coded without prediction (I) by determining, in a sequence of spatially synchronized images, the images which exhibit the lowest value of the activity represented by an activity parameter, these images thereby being identified as being of the type coded without prediction, that is to say of type I.

The method may also make it possible to identify the images of the type coded with prediction (P) by determining, in a sequence of images, the images exhibiting the highest value of the activity represented by an activity parameter; which is preferably the average activity AM of at least one area of the images of the said sequence.

This activity parameter can be determined over all of the image or over an area of interest thereof.

Advantageously a said determination is carried out after high-pass filtering of the signal representative of the activity parameter of the images of the said image sequence, in such a way as at least partially to eliminate the change in the content of the images within the sequence.

The said high-pass filtering advantageously consists in calculating each point of the filtered signal by calculating the smallest positive offset between a point corresponding to the current image of the unfiltered signal and the adjacent points corresponding to the preceding image and to the next image.

Other characteristics and advantages of the invention will emerge better on reading the description which will follow, in connection with the attached drawings, in which.

The invention as described below employs knowledge of the method of coding image sequences by a standard, for example MPEG2. In fact the particular features of this technique offer advantageous possibilities for the processing of the coded video signal. A brief description of the algorithm elements set up in MPEG is useful for an understanding of the principle of the invention, but it will be noted that the invention applies equally to the other ways of digital coding.

Figure 1:
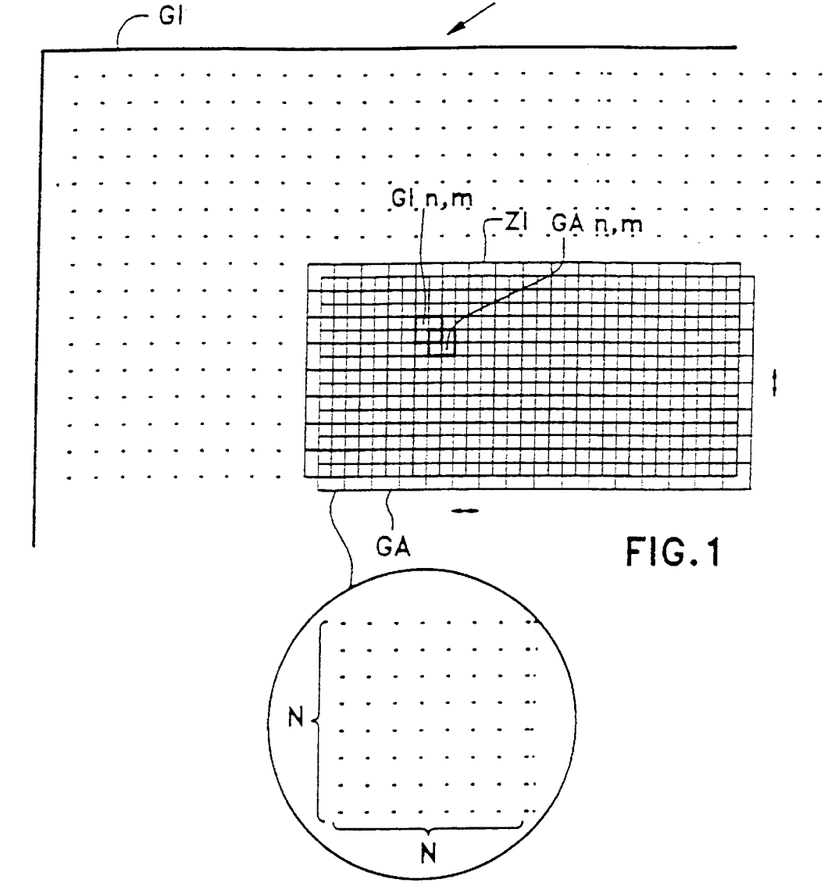
FIG. 1 illustrates the method implemented according to the present invention.

In order to achieve the reduction in the quantity of information contained in IM images, the coding, for example MPEG1, MPEG2 or ISO H261 or else JPEG (in the case of spatial synchronization) is based on certain algorithmic tools. For coding values of image points or pixels, of the image, the abovementioned algorithms take advantage of the similarity between adjacent pixels over a single image (spatial redundancy) and between adjacent images (time-based redundancy). The discrete cosine transform (DCT), by blocks of 8×8 pixels, is applied in order to reduce the spatial redundancy. The image is therefore segmented into blocks beforehand. The reduction in information is done by rounding the values of the DCT coefficients obtained (scalar quantization). The cosine transform by blocks of N×N pixels (N=8, for example) changes the basis of representation of the image. This transform is performed on the basis of an initial grid GI having blocks of N×N pixels and the edges of which are the edges of the initial coded image IM (see FIG. 1). In order to reduce the time-based redundancy, a predictive coding is used. It produces an estimate of the samples to be coded by a prediction obtained on the basis of the preceding values of the signal. The prediction error is coded, and it offers a substantial reduction in the information to be represented. The prediction is carried out on the foregoing images on the time axis. The "error" image obtained is subsequently coded by the DCT transform. On decoding, the images are reconstituted from the prediction images and from the coded data.

The regulation which makes it possible to obtain a constant throughput at the output of the encoder dictates the use of regularity in the application of the various time-based algorithms. In fact, the MPEG2 standard specifies a predictive coding syntax applied to the image sequences. Each image is coded according to a particular type of prediction: I, P and B.

- the I (intra) images are coded by DCT without prediction and thus without taking account of their past. They are regarded as fixed and isolated images.
- the P images are obtained by predictive coding on the basis of the I or P image which precedes it.
- the B (bidirectional) images specific to MPEG-2 are obtained on the basis of the two closest I or P images, by interpolation.

A group of images or GOP is a structure which is repeated over time and represents the video sequence. It is composed of a number of images n equal to the distance between two "I" images and in which the "P" images have a periodicity m. These parameters fully characterize the structure of the GOP (see FIG. 2). In the example represented, n=12 and m=3.

The DCT is widely used for image coding. The method described below is proposed, by way of example, for application to analysing coded and decoded sequences with a view to carrying out all the is synchronization operations. This advantageous approach demonstrates a great effectiveness of robustness.

A first subject of the invention is the spatial synchronization of the image on the position of the initial coding grid GI. In fact, for reasons of reframing, an operation of identification of the position is carried out. To do that, indicators obtained on the basis of the cosine transform are used.

Upon coding, the tables of scalar quantization of the DCT coefficients lead to the energy of the block analysed being concentrated over a limited number of representative coefficients. The others are rounded to zero value. This operation remains the very kernel of throughput reduction.

On a coded and decoded digital image, this property remains valid. In fact it is observed that, if examination is carried out at the level of the blocks, the position corresponding to the initial coding grid GI represents a particular energy concentration. Consequently, this property constitutes the basic idea which is employed to identify the position of the initial coding grid. Among the possible transforms, the DCT transform is advantageous since it is used in the MPEG standard. Other block transforms can be used (for example Fourier transform, DWT wavelet transform), and it is not necessary for the transform used to be the same as that according to which the initial image was coded.

The basic property used in order to resynchronize spatially is the concentration of the energy of the coefficients, for example DCT coefficients, about the DC component of each image block.

In order to carry out this synchronization function, a spatial indicator has advantageously been tested.

The property considered is more selective for the "I" images than for the other types of images. The activity of a block is defined, for example, by the following equation:

$$asb = \sum_{(u,v) \neq (0,0)} |F(u, v)|$$

F(u, v) designating the transformed coefficients of the block to which the discrete cosine transform DCT is applied.

The following equation defines the average activity of the image or of an area of interest ZI of it, via the average of the block activities $$AM = \overline{asb}$$

One of the properties of the block transforms, and in particular of the DCT, is their capacity to compact information of the image into a small number of coefficients. The AM parameter indicates the average quantity of information in the DCT domain which is contained in the blocks analysed. This parameter is calculated for a given position of the grid GA of the blocks which can cover the whole of the image, or else only the area of interest ZI.

Although effective, the parameter asb gives no information on the distribution of the energy in the DCT coefficients, and, moreover, asb is sensitive to the amplitude of the DCT coefficients.

Hence the spectral entropy esb of a block will therefore be used for preference, defined, for example, in the following way:

$$esb = - \sum_{(u,v) \neq (0,0)} p(u, v) \log_2 [(p(u, v))], \text{ in which } p(u, v) = \frac{|F(u, v)|}{asb}$$

The spectral entropy ES of the image (or of an analysis window ZI) is given by the average of the spectral entropies esb of the blocks of the analysis grid GA in the analysis window ZI or for the whole of the image.

$$ES = \overline{esb}.$$

At the initial position of the grid GI of the blocks, that is to say at the position of their coding, a certain amount of information has been ignored and discarded by the coder. This action allows it to reduce the relevant information to be coded. Furthermore, the coding of the different blocks is carried out independently of their neighbours on the same image.

According to the invention, an analysis grid GA having blocks of N×N pixels is employed, and it is shifted in order to carry out horizontal and/or vertical examination of the whole of the image or of the analysis window or area of interest ZI.

When the analysis grid GA is arranged at position corresponding to the initial coding, the parameters AM and above all the parameter ES exhibit a high degree of compaction for the DCT coefficients.

In contrast, when the average activity AM or the spectral entropy ES is calculated for an analysis grid GA taken at a position differing from that of the initial grid GI (see FIG. 1), it exhibits supplementary information. This information takes account of all the discontinuities and the differences in content between the adjacent blocks, that is to say of the block effect which is due to the independent coding of the different blocks of the same image.

In any event, it should not to any extent exhibit any energy concentration as is observed in the case in which the position of the analysis grid GA is coherent with the initial coding.

Figure 3:
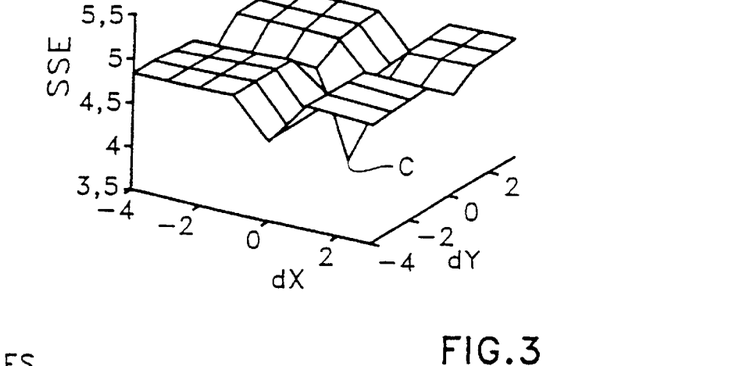
FIG. 3 is an example illustrating the variation in the spectral entropy parameter ES as a function of the spatial phase shift of the analysis grid GA, for an image I of a sequence coded at 4 Mbits/second.

The coherent or initial position of the coding blocks is not known a priori. Examination of all the positions with horizontal and/or vertical shifts by (dX, dY) pixels is carried out using an analysis grid GA. This leads to the consideration that there exists a minimum value of the parameter AM or ES at the position sought (coherent). An example of such an examination is represented in FIG. 3.

The point C corresponds to the minimum of ES among all the positions of examination of the grid GA for the same image.

The minimum value of ES (point C) at the coding position is represented here by a zero offset (dX, dY)=(0,0).

The parameter AM or ES calculated is thus an indicator of the average dispersion of the coefficients F of the DCT transform of the blocks. At the position of coding of the blocks (point C of FIG. 3), a dispersion value exhibiting a relative minimum with respect to the other examination positions is obtained.

A minimum may be obtained by examination while shifting the analysis grid GA solely in the horizontal direction, in order to obtain horizontal synchronization, or by examination while shifting the analysis grid GA solely in the vertical direction in order to obtain vertical synchronization, but examination is preferably carried out along the two directions, horizontal X and vertical Y, the minimum value of AM or ES giving the synchronization position corresponding to the position of the initial grid.

Figure 2:
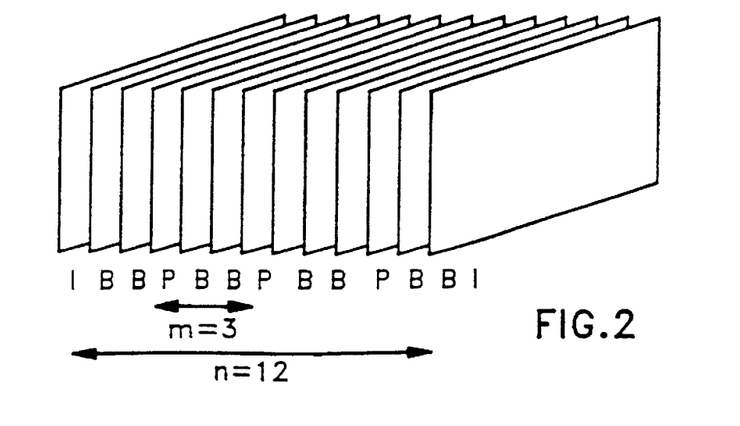
FIG. 2 represents an example of the structure of a group of images GOP.

The analysis grid GA may cover the whole of the image, but it can be limited to a region of the image constituting only an area of interest ZI as represented in FIG. 2.

In the case in which the analysis grid GA concerns the whole of the image, its dimension nevertheless remains slightly less than that of the image to be analysed, in such a way that the analysis grid GA does not extend beyond the image during the examination. An analysis grid GA will be used, for example, with dimensions less than that of the image by N pixels, both in the horizontal direction and/or in the vertical direction, depending on whether the examination has to be carried out along one direction or along both these directions.

This criterion is used according to the invention for the spatial synchronization. However, it is important to note that the use of this approach is possible only if the image is sufficiently rich in content. A prior condition is defined on the basis of the indicator of the average activity or richness AM of the content of an image. In effect, a minimum value is required at the spatial synchronization position, namely AM>$AM_o$. The threshold $AM_o$ is determined in such a way as to eliminate the low-activity images over their entire surface or in the area ZI.

In the case of the "I" images coded without time-based reference, the parameter AM or ES exhibits a minimum value when it is calculated at the position of coding of the blocks. On the "P" or "B" images, the same property is satisfied even if the response obtained is somewhat less clear cut.

Figure 4:
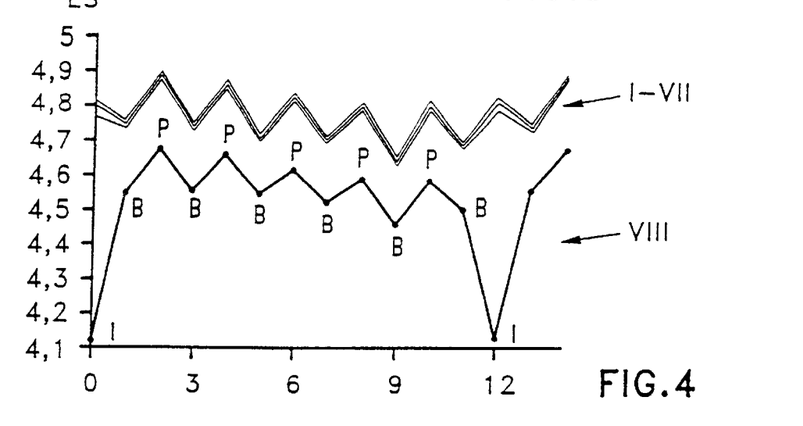
FIG. 4 illustrates an example of a time-based variation in the spectral entropy parameter ES of a GOP sequence for examination along the horizontal direction X, assuming the vertical synchronization Y to be known.

This property is brought to light in the example represented in FIG. 4, obtained on the basis of a sequence of 12 images coded at 5 Mbits/second. For the requirements of the representation, the vertical synchronization is assumed to be known and only the horizontal synchronization is assumed to be unknown. The upper curves I to VII represent the results obtained for the seven horizontal examination positions which do not correspond to the initial position. The curve VIII corresponds to the position of synchronization on the analysis grid GA, that is to say on the initial coding position. These curves show that, on a given image, the parameter ES always has a lower value when it is calculated at the initial coding position. On the curve VIII can be recognized the "I" images, for which the discrepancy between the coherent position and another position is relatively larger than for the other images. In this case, it can also be seen that the group of images GOP consists of n=12 images, since this is the number of images which separates two I-type images. The P-type images are also recognized, which exhibit maxima of the parameter ES. The other images are of type B.

The search for the spatial phase of an image of the video sequence thus consists in calculating the parameter AM or preferably ES. This calculation is carried out at each of the N×N, i.e. 8×8 possible positions of the coding grid (see box of FIG. 1). The spatial shifting of the coding blocks with respect to an original grid the edges of which correspond to those of the original image is given by the position of the minimum value of the parameter AM or ES. This calculation may be invalidated if the value of AM at the coding position found is less than a threshold $AM_o$, which corresponds to a content too impoverished to make it possible to carry out any reliable analysis.

This limitation of the method is not fundamentally a problem. Let us take the example of the application to a cascade of coding-decoding operations. In effect, for images which are impoverished in terms of content, even if they are not spatially synchronized, the encoder will have no difficulty in coding them. Consequently, the cascading of coders-decoders does not impair only those images which are rich in content. For these, the synchronization is imposed and the method proposed is effective and robust.

The method of spatial synchronization over an image can be carried out in the following way:

a) acquire the image, b) determine the values of ES at all the possible positions of the analysis grid GA, c) determine the spatial phase shift which is given by the position of the minimum value of ES, d) test the validity of the measurement in order to verify whether the content of the image is sufficiently rich:

if AM>$AM_o$, then synchronization is established, otherwise return to a).

The method described in the previous paragraph corresponds to the case of digital images. However, the use of analog signals is still frequent in practice. The method can then be adapted to the case of analog images having previously been subjected to digital coding.

In the case in which the images for which spatial synchronization is sought are in the form of an analog signal, the spatial offset may in fact have a value which is not equal to an integer number of inter-pixel intervals (or pitch of the pixels) in the horizontal direction. This shift may possibly have been introduced at the level of the Analog-Digital Converter. The method set out above does make it possible to detect the horizontal phase shift, but it rounds to an integer number of pixels by reason of the image being rendered discrete.

It is possible in this case, according to the invention, to correct the fractional (or sub-pixel) part of the value of the horizontal spatial phase shift (that is to say in the direction of the lines of the image). The method then makes it possible to achieve spatial synchronization to within a fraction of a pixel. This stage is generally subsequent to a spatial synchronization carried out to within one pixel by the method set out above, but it is also possible to obtain sub-pixel horizontal synchronization solely using the method described below, illustrated by FIG. 5.

Figure 5:
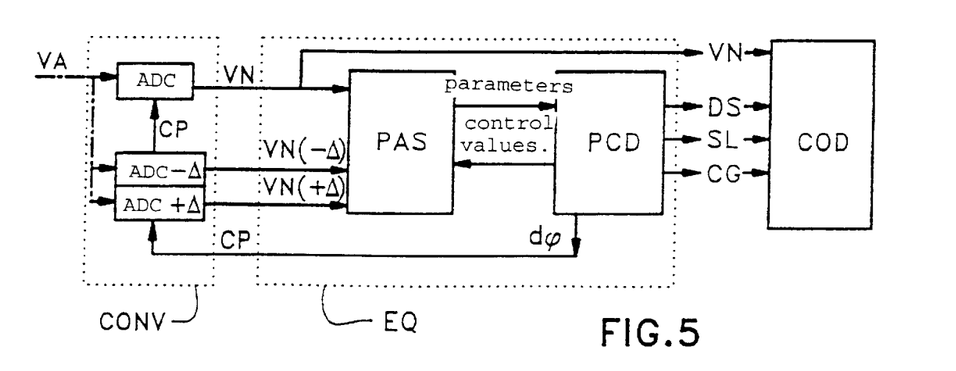
FIG. 5 is an example of implementation of the invention applied to an analog signal.

In the latter, the phase of the digitizing clock H of the Analog-Digital Converter ADC tasked with acquiring the analog video input signal VA is driven by the signal CP generated by the digital synchronization equipment EQ. This slaving makes use of the Spectral Entropy indicator ES.

The equipment EQ receives, at its input, the digital video signal VN digitized by the ADC converter, and it produces, as output, an (X, Y) spatial phase-shift signal DS, an image group GOP composition signal CG, and a logic signal SL for the presence or absence of an I image, which are supplied to a coder, COD.

An activity-parameter calculating processor PAS is employed to calculate the AM or ES parameter on the basis of VN and possibly of shifted signals VN(-Δ) and VN (+Δ) as will be explained later. The decision and control processor PCD analyses the results produced by the PAS processor and carries out the search for the spatial synchronization value DS, the control value CP of the phase for slaving the ADC converter and the syntactic MPEG2 analysis of the sequence and the detection of the "I" images.

The said phase-shifting operation can be carried out at one point in time, for example once upon initialization of the equipment. It can also form part of a procedure for adapting to the analog system whenever it is necessary to readjust the system to new conditions. It can also be carried out over a continuous video sequence.

Figure 6:
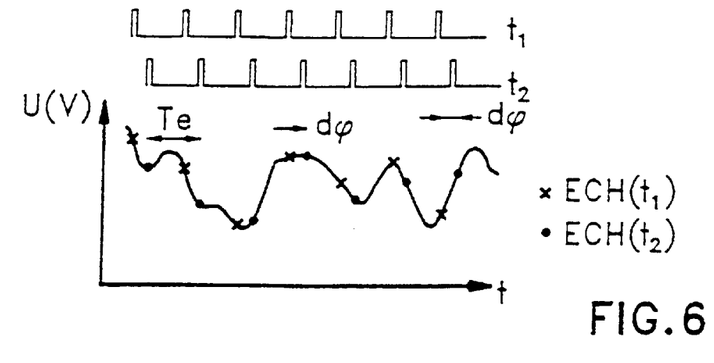
FIG. 6 illustrates various possibilities for digitizing a portion of a line of an analog signal at two sampling instants t$_1$ and t$_2$ offset in phase by dȯ.

The principle of this method is an extension of the preceding one to the continuous (or analog) domain, in contrast to the discretely quantified domain. Let us reiterate it in the case of a digital image: examination of all the possible positions of the analysis grid GA of the blocks can be carried out only on integer values of pixels by reason of the image having been rendered discrete. The examination of the sub-pixel positions is thus carried out here via a small alteration dφ of the phase of the sampling, and in particular of the phase of the sampling clock of the analog-digital converter ADC. This alteration dφ introduces a phase shift less than the sampling period Te which corresponds to a shift of 1 pixel. FIG. 6 illustrates the case of two samplings ECH($t_1$) and ECH($t_2$) carried out at instants $t_1$ and $t_2$ which are offset in such a way as to correspond to a phase shift dφ. The phase control is achieved, for example, by controlling the phase of the digitally controlled oscillator (DCO) which generates the sampling clock H. Subsequently, the acquisition of a new digital image is carried out for each new examination position.

Figure 7:
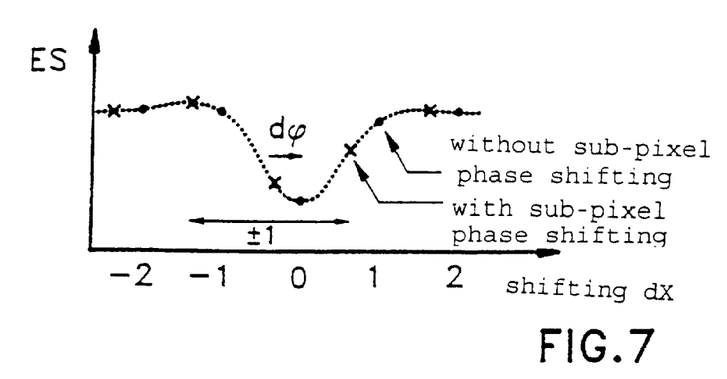
FIG. 7 illustrates a search for the position corresponding to the minimum of the ES parameter.

The optimal digitization phase is given, as before, by the criterion of the minimum of AM or of ES over a given examination range by controlling the movement of the analysis grid GA by varying the phase dö. The graph of FIG. 7 shows the profile of the continuous function ES(DX) and the values which are accessible with the spatial synchronization method via an integer number of pixels. It is seen, on the one hand, that the introduction of a digitization phase shift makes it possible to choose new positions for calculating values of ES. A very fine variation in dp over a time interval Te corresponding to a shift of one pixel offers the possibility of exactly covering the function ES(dx) (see FIG. 7).

The sub-pixel shift correction method preferably includes two stages. The first stage consists in searching, by integer values, for the closest position of the minimum of AM or of ES. The second stage is iterative and consists in acquiring images which are slightly dφ phase-shifted, varying over a range of ±Te (i.e. +1 pixel), and in calculating the parameter AM or ES at the position found at the first stage, but which is found to be shifted by dφ

$$d\phi = 1/N \cdot Te$$

N defines the fineness of the examination and precision with which the optimal position will be obtained. For each increment in the phase, AM or ES is calculated. The optimal phase shift dö of the digitization clock, that is to say the one which is to be maintained, corresponds to the minimum of the function AM or ES.

However, strictly speaking there exists one condition for achievement of spatial synchronization. In fact, at each value of the phase, an acquisition is performed. It would therefore be preferable to use a video signal representing a fixed image at the output of the analog-digital converter, for example an image stored in memory. In this way, the same acquisition is carried out, and subsequently the processing operations are carried out on the same image.

Figures 8A, 8B:
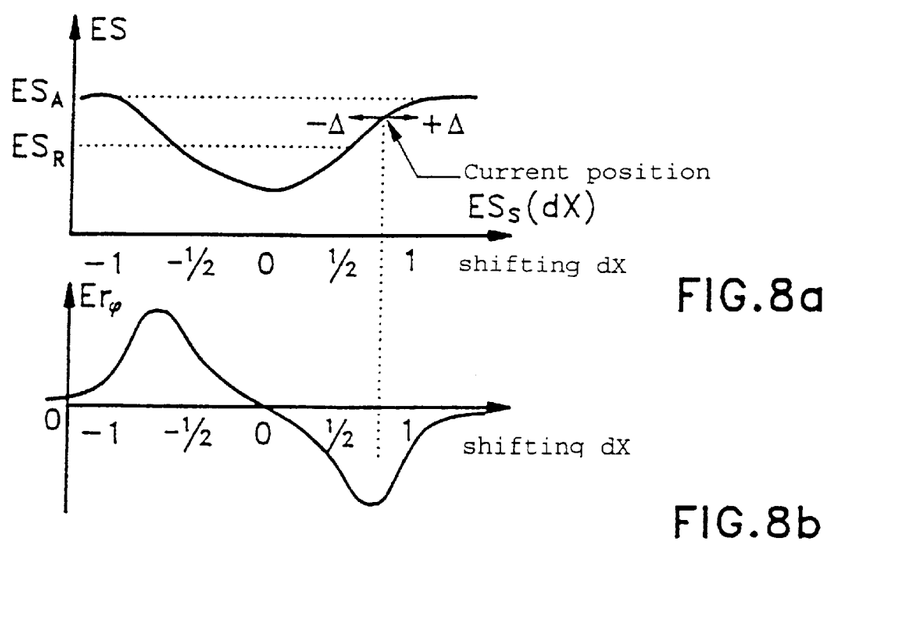
FIGS. 8a and 8b illustrate the obtaining of a phase-error signal.

The method may be implemented with variable images, as illustrated in FIGS. 8a and 8b.

In fact, on the basis of the current position of the phase shift dφ, corresponding to a separation of dX inter-pixel intervals and having an entropy value ES(dx), two entropy measurements are taken on deliberately shifted positions, one called advance position, i.e.:

$$ES_a(dX) = ES(dX + \Delta)$$

the other called retard position, i.e., $$ES_r(dX) = ES(dX - \Delta)$$

these measurements being averages of the value of the parameter ES over several images, and Δ being less than the pitch of the image points or pixels in the direction of the lines of the image.

The calculation of an error function is carried out on the basis of these measurements:

$$ES_\phi(dX) = ES_r(dX) - ES_a(dX).$$

This error drives feedback on the sampling clock phase. It is represented in the figures.

If appropriate, this error is normalized for each image, for example by the average spectral entropy ES of the image or of the area ZI in order to make it more independent of the content of the image.

Several successive measurements are taken at the same position of the phase shift dφ, and are then low-pass filtered before supplying the slaving control value for the digitally controlled oscillator DCO generating the sampling clock.

This control value is, obviously, applied in synchronism with the acquisition of the images.

As far as the practical implementation of this variant is concerned, the measurements of the advance and retard spectral parameters can be made:

either in parallel, which requires three acquisition systems (one for the channel called synchronous channel, which feeds the video coder, two for the advance and retard measurements of AM or ES), or sequentially, which reduces the requirement to two acquisition systems. This requirement is limited to a single system if initialization is allowed (convergence of the slaving). In the sequential case, the alternating of the advance and retard measurements on successive images should be synchronous with the image-acquisition rate.

Moreover, the pitch of the shift A can be adapted to the requirement:

$\Delta=1$ pixel: $ES_r(dX)$ and $ES_a(dX)$ are available directly during the calculating stage carrying out synchronization, to within one pixel.

$\Delta<\epsilon$: if $\epsilon$ is chosen to be sufficiently small as not to distort the video coder, this coder can be fed with one single acquisition channel offset alternately in phase advance or retard in order to take the measurements of the spectral activity or spectral entropy parameters $ES_x(dX)$ and $ES_a(dX)$.

The invention thus offers a means of fine spatial resynchronization to within (1/N pixel) corresponding to the phase resolution of the digitally controlled oscillator DCO generating the sampling clock.

This operation is carried out by slaving the phase of the digitization clock of the analog-digital converter on the basis of the calculation, for example, of spectral entropies of the image at the output from the video system, for example according to the following sequential procedure:

a) digitizing an image, b) searching for the horizontal phase shift rounded to an integer number of pixels (spatial synchronization procedure), c) alternately, at a rate corresponding to a whole number of images, introducing a horizontal phase shift of $\pm\Delta$ onto the analog-digital converter ADC, and taking the measurements $ES_r(dX)$ and $ES_a(dX)$ in synchronism, after digitizing the corresponding images, d) calculating the error function and filtering it by low-pass filtering with the previous measurements, e) applying feedback to the clock of the analog-digital converter ADC. Repeating the procedure on c).

In the case of the cascading of two coders, we have stressed the importance of spatial synchronization of the pixels to be coded. In fact, this operation is stipulated so as to take advantage, in an optimal way, of the compression techniques while taking account of the final quality of the images. Moreover, we have described the syntax recommended by the MPEG coding family for the coding of image sequences (I, P and B). By taking account of this syntax, it is also possible to optimize the use of the compression methods. In fact, since this syntax acts on the number of bits allocated per image, as well as on its quality, it is advantageous, or even essential, to comply with it for cascading.

According to the invention, it is possible to establish an identification of the time-based syntax of the initial coding. This is done by recognition of the I, P and B images. The time-based synchronization, presented here, is for the purpose of identifying which are the I, P and B images. This operation is carried out only after having carried out the spatial synchronization. The overall process can thus be summarized as:

a) acquisition of an image, b) searching for the spatial coding position, c) ascertaining whether this image is of "I" type, d) whether this image is of "I" type, then analysing the content of the preceding group of images GOP, and identifying the "P" and "B" images.

Figure 9A:
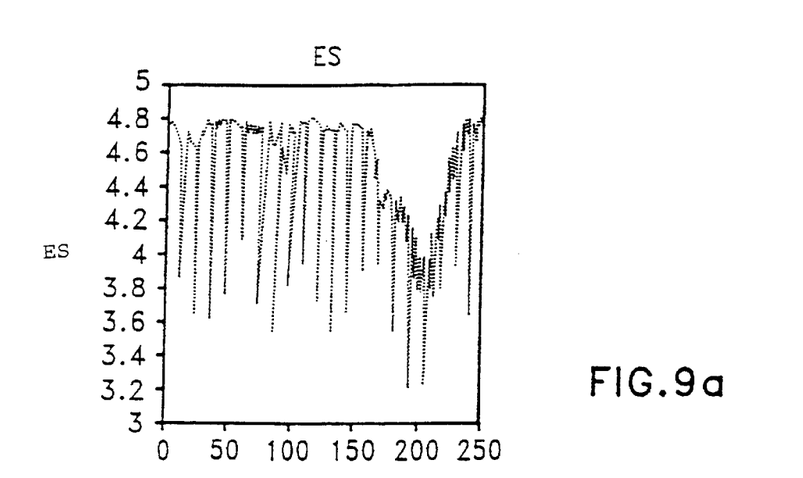
FIGS. 9a, 9b and 9c respectively illustrate the change in ES over 250 images of a sequence ticked at 4 Mbits/second after spatial synchronization (9a), the extraction of the local minima of ES after high-pass filtering (9b), and finally the result of the detection of the I images (9c)

The "I"-type images give a clear local minimum in time on a parameter such as AM or ES (see Figure No. 4). By reason of the mode of coding without prediction of the "I" images, the latter are in fact time-marked with respect to the other images. This is the case for sequences with low time-based activity or those which exhibit restricted changes in content. A representative example is the start of the sequence of FIG. 9a, images [0,150]

However, the values of the AM or ES parameter are related to the mode of coding of the image (I, P, B), but also to the content of the image, given its definition (see above). Hence, substantial movement is present in the second part of the sequence of FIG. 9a, towards the image interval [170, 220]. This is conveyed visually by a less detailed image. The coefficients of the DCT transform representing high spatial frequencies are less represented; the energy of the image is therefore on average more compacted towards the low frequencies, giving a lowering in the values of ES(t) in the interval of the images in question. Consequently, in this sequence, an overall lowering of the values of ES(t) is observed in the case of the "I" images. The presence of the local time minima, discriminating for the "I" images, is preserved. The correct identification of the images preferably relies on processing on AM(t) or ES(t) for extracting these local minima.

Figure 9B:
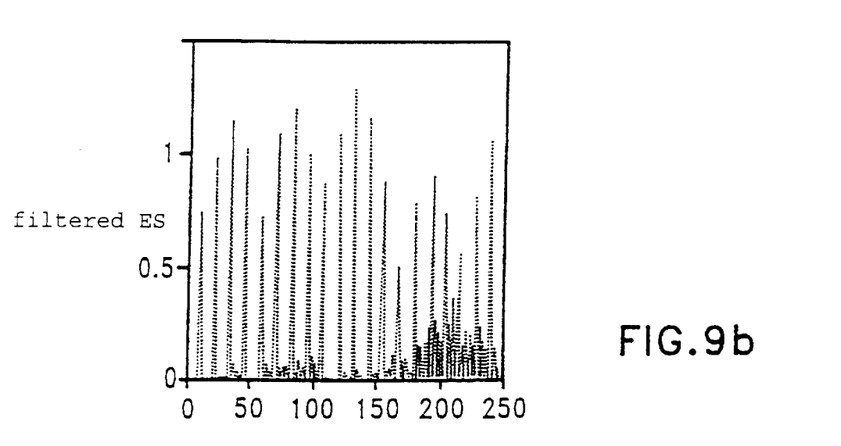

In order optimally to separate the influence of the content of the sequence and the information sought, high-pass filtering can be carried out (FIG. 9b). In fact, the local minima on ES(t) last the time of an image, that is to say one point on the time axis, whereas the change in the content within a sequence is slower.

For the high-pass filtering operation, each point $ES_{filtered}(t)$ is obtained by calculating the smallest positive offset between ES(t) for a given image and its two neighbours (for the previous image and for the next image)

$$ES_{filtered}(t)=\max[\min(0,ES(t)-ES(t-1)), \min(0,ES(t)-ES(t+1))]$$

At this point of the processing, all the short-duration variations in the values of ES(t) are extracted (FIG. 9b). It is possible, however, that there might be no marked peaks in this function. This corresponds to the case in which the groups of images are composed only of "I" images; the local minima of ES(t) are no longer discernible, which gives a practically constant response for $ES(t)_{filtered}$. This hypothesis is examined before embarking on further processing via the test:

$$\text{StandardDeviation}_K(ES(t)_{filtered})<ThresholdES_1$$

It is considered here that the fluctuations in $ES_{filtered}(t)$ are negligible when the standard deviation of $ES_{filtered}(t)$ over the last K images is less than a given threshold. One possible conclusion is that all the groups of the sequence of the K images consist solely of images of "I" type. The value of K can be fixed at a given value, for example the maximum length of the group of images GOP fixed on the basis of MPEG2 recommendations, for example.

In the case in which the foregoing condition is not fulfilled, it is considered that local maxima exist for $ES_{filtered}(t)$. Consequently, this observation implies that the group of images consists of "I" images and of other types of images.

In order to isolate the "I"-type images, an adaptive thresholding is performed on $ES_{filtered}(t)$. In fact, as the value of ES(t) depends on the content of the image, that of $ES_{filtered}(t)$ likewise depends on it. In order to take account of this fact, an arbitrarily fixed threshold cannot provide the expected discrimination for detection of the local maxima of $ES_{filtered}(t)$. The value of this threshold is adaptive, depending on the value of the parameter $ES_{filtered}(t)$ at the previous "I" image, for example:

$$ThresholdES_2(t_i)=[ES_{filtered}(t_{iprevious})]/2$$

For detection of the first "I"-type image, the threshold value chosen is equal to the maximum of $ES_{filtered}(t)$ found over several images (for example K=16 here). The value of K should be chosen in such a way that there is at least one "I" image in this period.

$$ThresholdES_2(t_{first\ image\ i})=\max_k(ES_{filtered}(t)/2$$

Figure 9C:
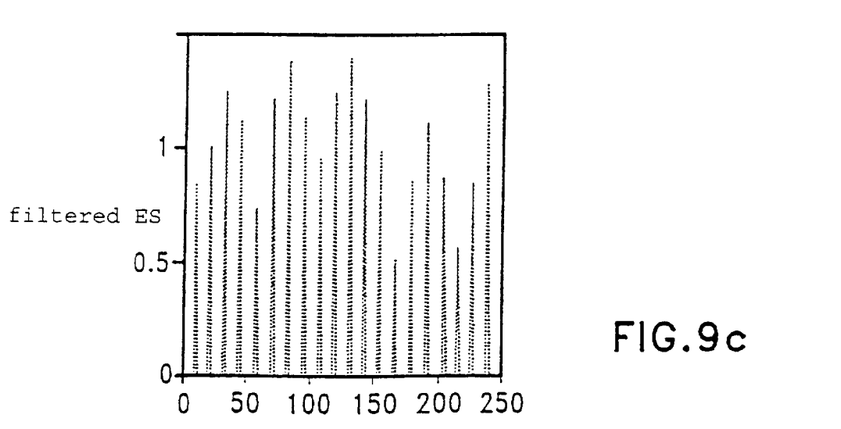

The values of $ES_{filtered}$ which are less than the threshold $ThresholdES_2(t_i)$ are forced to zero, and the others are kept. With the peaks corresponding to the "I"-type images appearing clearly by counting the zero values, the size of the group of images GOP is found. In the example of FIG. 9c, the number n of images in the groups of images GOP is equal to 12.

The detection of the "I"-type images can be carried out in the following way:

a) acquisition of the image at the instant t,
b) spatial synchronization,
c) calculation of ES(t),
d) high-pass filtering of the historical values of ES(t) over K images as from the first "I"-type image,
e) if $StandardDeviation_k(ES(t)\ filtered)<ThresholdES_1$, all the images are of "I" type (there is no time-predicted image "P and B"),
otherwise:
f) alteration of the adaptive threshold:

$$ThresholdES_2(t_1)=[ES_{filtered}(t_{1\ previous})]/2$$

g) if $ES_{filtered}$ is above the threshold $ThresholdES_2(t_1)$, this image is an "I" image,
h) the size of the group of images is given by the distance between the two successive "I"-type images.

After detection of the "I"-type images, it is possible to detect the "P" images.

In order to recognize the various types of images, the present invention proposes, in the first place, to identify the reference of the group of images GOP. In fact, the "I"-type images can be regarded as such, since they are distinguished from the others by the compression algorithms which are applied to them. Once this operation has been carried out, it is possible to detect the other categories of images.

In order to detect the "I"-type images signalled in the group of images GOP, the high-amplitude minima of ES(t) have been used. In order to identify the "P" images, one advantageous property is put to use. In fact, these images produce local maxima on the ES parameter, but these maxima are more marked with the parameter conveying the spatial activity AM of the images with $$AM=\bar{a}sb, \text{ with respect to the "B" images.}$$

Figure 10A:
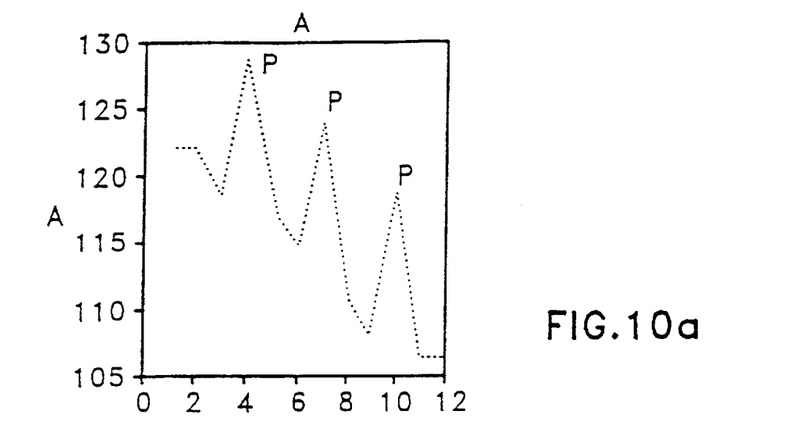
FIGS. 10a to 10c respectively illustrate the signal AM for extraction of the peaks of the activity parameter AM over 12 images of a GOP sequence coded at 4 Mbits/second (10a), the AM signal filtered by high-pass filtering (10b), and the result of the detection of the P images (10c).

In the first place, the spatial indicator of the images AM(t) is calculated for the entire video sequence. Knowing that the position of the "I"-type images is now known, an analysis of the group of images free from the "I" images can be carried out. This is conveyed by the replacement of the AM(t) values corresponding to "I"-type images by the value corresponding to that of the image which precedes it (FIG. 10a). The method followed is similar to the previous one.

$$AM_{filtered}(t)=\min[\max(0,AM(t)-AM(t-1)), \max(0, AM(t)-AM(t+1))]$$

Figure 10B:
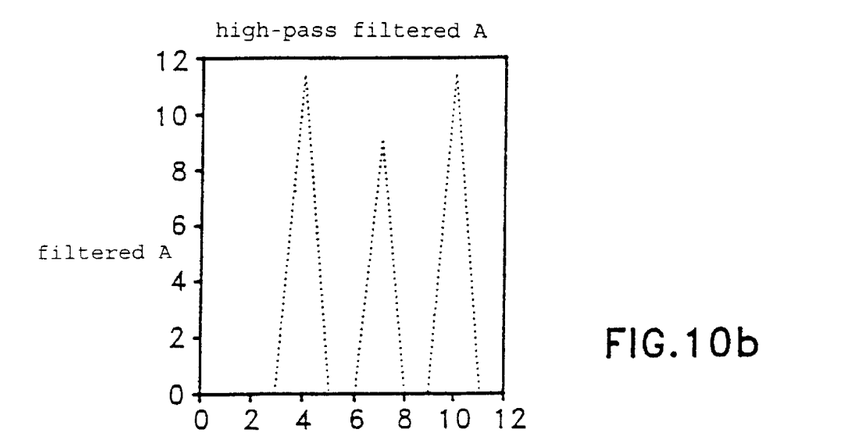

After high-pass filtering, the signal is represented in FIG. 10b.

In the same way as for the identifying of the "I"-type images, an adaptive thresholding gives the position of the "P"-type images, in the event that "B"-type images exist.

The assumption of the absence of "B" images is tested by:

$$StandardDeviation(AM_{filtered})<ThresholdA_I$$

In the opposite case, the application of the thresholding operation makes it possible to find the position of the "P"-type images and consequently the distance between two images of this type:

$$ThresholdA_2(t_{first\ P\ image}) =, \max_k(AM_{filtered}(t))/2$$

$$ThresholdA_2(t_P)=[AMfiltered(t_{previous\ P})]/2$$

Figure 10C:
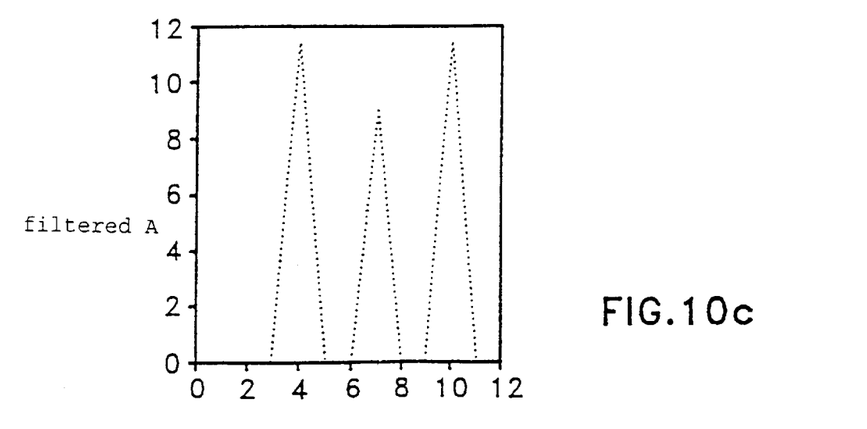

The result of the detection of the "P" images is illustrated in FIG. 10c.

The detection of the "P"-type images can be carried out in the following way:

a) acquisition of the image at the instant t,
b) spatial synchronization,
c) calculation of AM(t),
d) high-pass filtering of the historical values of AM(t) since the last "I"-type image,
e) if the $StandardDeviation(AM_{filtered})<ThresholdA_I$, all the images are of "P" type (there is no predicted bidirectional image "B"), otherwise:
f) refresh the adaptive threshold:

$$ThresholdA_2\ (t_p)=[AM_{filtered}(t_{previous\ P})]/2$$

g) if $AM_{filtered}$ is higher than the threshold $ThresholdA_2$ $(t_p)_1$ the corresponding images are "P"-type images.

It will be noted that it is also possible to recover the "P"-type images from the maxima of the ES function (see the curve of FIG. 4, for example), but it will be noted that this ES function is less discriminating than the AM function.

The present invention also proposes a method of recognizing the structure of the groups of images as it has been defined by the MPEG2 recommendations.

This identification of the syntax of the groups of images can be carried out, for example, in the following way:

a) acquisition of the image at the instant t,
b) spatial synchronization,
c) identification of the position of the "I" images in the group of images GOP,
d) detection of the "P"-type images,
e) proposing the final structure of the GOP; position and distance between the "I"-, "P"- and "B"-type images, and of the values of n and of m.

The present invention offers an extended field of application.

In several applications in which digital sequences are coded by the recommended techniques of throughput reduction, it is necessary to perform spatial and/or time-based synchronization operations with respect to a coded reference digital video. As examples, applications of cascading of coders or certain automatic methods for evaluation of the image quality may be quoted here.

In fact, in the first case in point, the synchronization affords an optimization of the performance of the operation in terms of final quality of the coded video signals reproduced at the end of the system. The absence of synchronization may prohibit cascading due to the permanent degradation of the quality of the coded and decoded signals, unacceptable to the users.

For the second application, certain evaluation methods require calculation of an error signal originating from the calculation of the difference between two signals: the original coded and broadcast signal at the start of a transmission system, and the degraded signal obtained at the end of the system. In this case again, achievement of synchronization makes it possible to ensure an effective calculation of the error signal.

In the present description, spatial and time-based synchronization procedures have been described. They are subdivided into a spatial method applicable for reframing the image to within one pixel and/or a procedure for correcting the horizontal phase shift by a sub-pixel.

The time-based method is used to identify the structure of the group of images as it was defined by the MPEG2 standardization. This method makes it possible to detect images of "I", "P" and "B" type. In this way, the syntax of the groups of images GOP is determined. The method according to the invention exhibits great robustness to noise and to variations in the content of the image. Consequently, it demonstrates high effectiveness for analysing the data used by the coding techniques. It finds application in equipment handling digital and coded image data.

In particular, it makes it possible to cascade items of equipment, spatial synchronization to within one pixel or to within a fraction of a pixel being employed between each operation of the cascading.

The invention can be implemented using a linear and orthogonal transform. In addition to the examples already quoted, this transform may be a discrete sine transform, a Haar transform, a Hadamar transform or else a Slant transform.

What is claimed is:

1. A method for synchronization of the spatial position of a video image in order to recover the position of an initial grid for digital coding of the image by coding blocks without using a reference image, the method comprising:
   a) shifting, along the direction of the lines of the image and/or along the direction perpendicular to the lines of the image, an analysis grid including said coding blocks and corresponding to at least one part of the image;
   b) determining, at each position of the analysis grid, transform coefficients of each block of the analysis grid via a block transform, and, for each position of the analysis grid, calculating from said transform coefficients an activity parameter representative of the activity of the image; and
   c) determining the position of the analysis grid for which the activity parameter represents minimal activity, and ratifying the position as a synchronization position.

2. A method according to claim 1, wherein the activity parameter is the average of the activities of the blocks of the analysis grid, the activity of a block being defined as the combination of the absolute values of the coefficients transformed by the block transform according to the following formula:

$$asb = \sum_{(u,v)\neq(0,0)} |k(u,v) \cdot F(u,v)|^p$$

where asb is the activity of a block, k(u,v) is a coefficient for weighting the component used, and p is a constant.

3. A method according to claim 1, wherein the activity parameter is the average of the spectral entropies of the blocks of the analysis grid
   with ES=ēsb, $$esb = -\sum_{(u,v)\neq(0,0)} |k(u,v) \cdot p(u,v)| \log_2[(p(u,v))],$$

$$asb = \sum_{(u,v)\neq(0,0)} |k(u,v) \cdot F(u,v)|^p \text{ and } p(u,v) = \frac{|F(u,v)|^p}{asb}$$

where esb is the spectal entropies of the blocks, ES is the average of the spectral entropies, k(u,v) is a coefficient for weighting the component used, and p is a constant.

4. A method according to claim 3, wherein:

$esb = -\Sigma p(u,v)\log_2[(p(u,v))]$, in which $$p(u,v) = \frac{|F(u,v)|}{asb} \text{ and } asb = \sum_{(u,v)\neq(0,0)} |F(u,v)|$$

and F(u,v) designates the coefficients of a single block transformed by the block transform.

5. A method according to claim 1, wherein the shifting of the analysis grid is carried out in steps equal to an inter-pixel distance or to a multiple thereof.

6. A method according to claim 1, wherein the shifting of the analysis grid take place in steps less than an inter-pixel distance.

7. A method according to claim 1, wherein the position of the analysis grid is ratified as a synchronization position only if the minimal activity which the activity parameter represents is higher than a given threshold.

8. A method according to claim 1, further comprising before stage a, a stage of analog-digital conversion using a converter exhibiting a sampling clock in order to sample image signals, and in that it includes, after stage c:
   a stage d of shifting the analysis grid in the direction of the lines of the image, modifying by at least one increment a sampling phase of the image signals; and
   a stage e of determination, for at least one shifted position of the analysis grid, defined during stage d, of the transformed coefficients and of the parameter representative of the activity of the image.

9. A method according to claim 8, wherein, during stage d, a sub-pixel is examined by shifting the analysis grid along a plurality of said shifted positions of the analysis grid which are obtained by altering the sampling phase in increments, and during stage e, there is determined, for each of the shifted positions, the transformed coefficients and the activity parameter representative of the activity of the image, and further comprising a stage f for determination of the position of said sub-pixel of the analysis grid for which the activity parameter represents a minimum value of the activity.

10. A method according to claim 8, further comprising, after stage e, a stage g of determining the activity parameter according to two said shifted positions, one of which is an advanced position and the other is a retarded position.

11. A method according to claim 10, further comprising, after stage g, a stage h of determining the average of the activity parameter over a number of images, for each of the advanced and retarded positions.

12. A method according to claim 11, further comprising, controlling feedback on the sampling phase, on the basis of an error signal which is the difference between the average of the activity parameter for the retarded position and the average of the activity parameter for the advanced position.

13. A method according to claim 1, further comprising, determining, in a sequence of images, images exhibiting, for an activity parameter of at least one area of the images of the sequence, values corresponding to the highest activity, these images thereby being identified as being of a second type.

14. A method according to claim 1, further comprising, determining, in a sequence of spatially synchronized images, the images exhibiting the lowest values of the activity represented by the activity parameter, these images thereby being identified as being of a type coded without prediction.

15. A method according to claims 14, further comprising characterizing a syntax of a group of images.

16. A method according to claim 14, wherein determining the images exhibiting the lowest values of activity is carried out after high-pass filtering a signal representative of the activity parameter of the images of the sequence of images, in such a way as at least partially to eliminate the change in the content of the images within the sequence of images.

17. A method according to claim 1, wherein the block transform is a linear and orthogonal transform.

18. A method for synchronization of the spatial position of a video image in order to recover the position of an initial grid for digital coding of the image by coding blocks, the method comprising:

a) shifting, along the direction of the lines of the image and/or along the direction perpendicular to the lines of the image, an analysis grid including said coding blocks and corresponding to at least one part of the image;

b) determining, at each position of the analysis grid, transform coefficients of each block of the analysis grid via a block transform, and, for each position of the analysis grid, calculating an activity parameter representative of the activity of the image;

c) determining the position of the analysis grid for which the activity parameter represents minimal activity, and ratifying the position as a synchronization position;

before stage a, a stage of analog-digital conversion using a converter exhibiting a sampling clock in order to sample image signals, and in that it includes, after stage c:

a stage d of shifting the analysis grid in the direction of the lines of the image, modifying by at least one increment a sampling phase of the image signals; and a stage e of determination, for at least one shifted position of the analysis grid, defined during stage d, of the transformed coefficients and of the said parameter representative of the activity of the image;

after stage e, a stage g of determining the activity parameter according to two said shifted positions, one of which is an advanced position and the other is a retarded position;

after stage g, a stage h of determining the average of the activity parameter over a number of images, for each of the advanced and retarded positions; and controlling feedback on the sampling phase, on the basis of an error signal which is the difference between the average of the activity parameter for the retarded position and the average of the activity parameter for the advanced position.

19. A method according to claim 18, wherein the activity parameter is the spectral entropy of at least one of image and the error signal is normalized by the average spectral entropy of at least one area of at least one image.

20. A method for synchronization of the spatial position of a video image in order to recover the position of an initial grid for digital coding of the image by coding blocks, the method comprising:

a) shifting, along the direction of the lines of the image and/or along the direction perpendicular to the lines of the image, an analysis grid including said coding blocks and corresponding to at least one part of the image;

b) determining, at each position of the analysis grid, transform coefficients of each block of the analysis grid via a block transform, and, for each position of the analysis grid, calculating an activity parameter representative of the activity of the image;

c) determining the position of the analysis grid for which the activity parameter represents minimal activity, and ratifying the position as a synchronization position; and determining, in a sequence of spatially synchronized images, the images exhibiting the lowest values of the activity represented by the activity parameter, these images thereby being identified as being of a type coded without prediction, wherein determining the images exhibiting the lowest values of activity is carried out after high-pass filtering a signal representative of the activity parameter of the images of the sequence of images, in such a way as at least partially to eliminate the change in the content of the images within the sequence of images.

21. A method according to claim 20, wherein the high-pass filtering includes calculating each point of the filtered signal by calculating a positive offset between a corresponding point to the unfiltered signal and adjacent points corresponding to the preceding image and to the next image.

* * * * *